United States Patent
Huo et al.

(10) Patent No.: US 11,928,503 B2
(45) Date of Patent: Mar. 12, 2024

(54) COGNITIVE SCHEDULER FOR KUBERNETES

(71) Applicant: International Business Machines Corporation, Armonk, NY (US)

(72) Inventors: Qi Feng Huo, Beijing (CN); Yuan Yuan Wang, Beijing (CN); Da Li Liu, Beijing (CN); Lei Li, Beijing (CN); Yan Song Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 17/354,304

(22) Filed: Jun. 22, 2021

(65) Prior Publication Data
US 2022/0405127 A1    Dec. 22, 2022

(51) Int. Cl.
  *G06F 9/50* (2006.01)
  *G06F 9/48* (2006.01)
(52) U.S. Cl.
  CPC .................. *G06F 9/4881* (2013.01)
(58) Field of Classification Search
  CPC ........ G06F 9/50; G06F 9/5005; G06F 9/5011; G06F 9/5016; G06F 9/5022; G06F 9/505; G06F 9/5083
  See application file for complete search history.

(56) References Cited

U.S. PATENT DOCUMENTS

| | | | |
|---|---|---|---|
| 2019/0288915 | A1 | 9/2019 | Denyer et al. |
| 2020/0034745 | A1 | 1/2020 | Nagpal et al. |
| 2021/0328858 | A1* | 10/2021 | Asveren ............. H04L 61/5007 |
| 2021/0365290 | A1* | 11/2021 | Zhang .................. G06F 9/5005 |

FOREIGN PATENT DOCUMENTS

| | | |
|---|---|---|
| CN | 108874542 A | 11/2018 |
| CN | 110231976 A | 9/2019 |
| CN | 110780998 A | 2/2020 |
| CN | 110990121 A | 4/2020 |
| CN | 111522639 A | 8/2020 |
| CN | 109783218 B | 9/2020 |
| CN | 111984381 A | 11/2020 |

OTHER PUBLICATIONS

Medel; "Client-Side Scheduling Based on Application Characterization on Kubernetes". Springer International Publishing AG 2017; GECON 2017, LNCS 10537, pp. 162-176, 2017. 15 P.
International Search Report; International Application No. PCT CN2022/091962; International Filing Date: May 10, 2022; dated Aug. 17, 2022; 8 pages.

* cited by examiner

*Primary Examiner* — Andy Ho
(74) *Attorney, Agent, or Firm* — CANTOR COLBURN LLP; Edward Wixted

(57) ABSTRACT

Embodiments are directed to deploying a workload on the best/highest performance node. Nodes configured to accommodate a request for a workload are selected. Information is collected on each of the selected nodes and the workload. Predicted response times expected for the workload running on each of the selected nodes are determined. The workload is deployed on a node of the selected nodes, the node having a corresponding predicted response time for the workload, the workload being deployed on the node based at least in part on the corresponding predicted response time.

17 Claims, 14 Drawing Sheets

FIG. 6A TABLE 1

| No | time | CPU of Node | Disk IO of Node | Network IO of Node | Memory of Node | Docker image layers |
|---|---|---|---|---|---|---|
| 1 | 2020 0404 1426 00 | 10.2% | 500(tps) | 2.1(M/s) | 102M | ["sha256:f3402ac2449fe4256b3c0aec37c65892cea8c8b40e8 a97d2f0ea6bff5b9ae02f", "sha256:0397f32e9193de231d364b170f0dd3436b287d155a7f f3ed84df05f61b7bff5f", "sha256:e1b28dbcd14b525023ea354e642da875803ec1f84c8 3a595d4d6e41c37c310f7"] |
| 2 | 2020 0404 1427 00 | 10.3% | 600(tps) | 1.2(M/s) | 110M | ["sha256:174e3fcd8d46cfcb9204e04ae2807a2a4ad3920ea4a c7bb0915a075bc87ed5aa", "sha256:5cbcf09f9ce8630f90421e998ee451ee420dcc5abc0f1 1fc05b90aca4159b271"] |
| 3 | 2020 0404 1428 00 | 10.4% | 750(tps) | 0.8(M/s) | 120M | ["sha256:1d86793ad1b355d4a2f1575a8d88cc00ecadadf7975 be0d6675c3ee66bdb56ee", "sha256:8afdfd24ead7b237b642f86528dae361cf2c0e39a201 45e31b4e575883b18a4", "sha256:f820afd7453b280da6b4e0cbd8aef0142ccd54478b8c 76054addcdbd50025905e", "sha256:cf7bca95a44bd2c5d9dad5ff5eaf83ecd1a90e2b53a 594c9df099d1500ae56", "sha256:45d5fdfad10cbd53ffdb4ee7a7c4b858af26c2cc27f178 ea367298dca7008537"] |

FIG. 6B TABLE 1 (CONTINUED)

| No | Concurrency count | Node name | Node info | Response time |
|---|---|---|---|---|
| 1 | 150 | Node1 | Z15 | 100ms |
| 2 | 102 | Node3 | Z14 | 121ms |
| 3 | 110 | Node2 | HPDL38 0 | 110ms |

FIG. 10

TABLE 2

| OS | OS LEVEL | Middleware | M-Version | Applications | A-Version |
|---|---|---|---|---|---|
| 16 bit | 8 bit | 16 bit | 8 bit | 16 bit | 8 bit |
| 65535 | 255 | 65535 | 255 | 65535 | 255 |

IMAGE LAYERS (HASH ID):
[
"sha256:f3402ac22449fe4256b3c0aec37c65892cea8c8b40e8a97d2f0ea6bff5b9ae02f",
"sha256:0397f32e9193de231d364b170f0dd3436b287d155a7ff3ed84df05f61b7bff5f",
"sha256:e1b28dbcd14b525023ea354e642da875803ec1f84c83a595d4d6e41c37c310f7",
"sha256: ca1f5f48ef431c0818d5e8797dfe707557bdc728fe7c3027c75de18f934a3b76",
"sha256: 91bac885982d2d564c0e1869e8b8827c435eead714c06d4c670aaae616c1542c"
]

DECIMAL: 65535, 128, 0, 64, 1, 1

BINARY (BITS): 1111111111111111, 10000000, 00000000000000000, 01000000, 00000000000000001, 00000001

SINGLE BINARY: 111111111111111111111111000000000000000000000000010000000000000000000001 00000001

Hexadecimal: ffff800000400000000

COGNITIVE SCHEDULER FOR KUBERNETES

BACKGROUND

The present invention generally relates to computer systems, and more specifically, to computer-implemented methods, computer systems, and computer program products configured and arranged for providing a cognitive scheduler for Kubernetes.

Kubernetes, commonly referred to as K8s, is an open-source container-orchestration system for automating computer application deployment, scaling, and management. Particularly, it aims to provide a platform for automating deployment, scaling, and operations of application containers across clusters of hosts. Kubernetes works with a range of container tools and runs containers in a cluster, often with images built using Docker. Docker is a set of platform as a service (PaaS) products that use operating service (OS) level virtualization to deliver software in packages called containers. Containers are isolated from one another and bundle their own software, libraries, and configuration files; containers can communicate with each other through well-defined channels. All of the containers can share the services of a single operating system kernel. The basic scheduling unit in Kubernetes is a pod. A pod is a grouping of containerized components. A pod includes of one or more containers that are guaranteed to be co-located on the same node. Many cloud services offer a Kubernetes-based platform or infrastructure as a service on which Kubernetes can be deployed as a platform-providing service. A scheduler is the pluggable component that selects which node an unscheduled pod (i.e., the basic entity managed by the scheduler) runs on, based on resource availability. The scheduler tracks resource use on each node to ensure that workload is not scheduled in excess of available resources. For this purpose, the scheduler must know the resource requirements, resource availability, and other user-provided constraints and policy directives such as quality-of-service, affinity/anti-affinity requirements, data locality, and so on. In essence, the scheduler's role is to match resource "supply" to workload "demand." Although existing techniques for scheduling and deploying pods have been suitable for their intended purposes, improvements are needed for scheduling and deploying pods as discussed further herein.

SUMMARY

Embodiments of the present invention are directed to computer-implemented methods for providing a cognitive scheduler for Kubernetes. A non-limiting example computer-implemented method includes selecting nodes configured to accommodate a request for a workload, collecting information on each of the selected nodes and the workload, and determining predicted response times expected for the workload running on each of the selected nodes. The computer-implemented method includes deploying the workload on a node of the selected nodes, the node having a corresponding predicted response time for the workload, the workload being deployed on the node based at least in part on the corresponding predicted response time.

This can provide an improvement over known methods for scheduling and deploying a pod by deploying the pod on the node based at least in part on the having the best predicted response time. This improvement considers the application's type and characteristics (e.g., of the pod) so that the best node can be selected.

In addition to one or more of the features described above or below, or as an alternative, in further embodiments of the invention the corresponding predicted response time comprises a lowest predicted response time of the predicted response times. Thus, advantageously providing an improvement that can dynamically select a suitable node with the lowest predicted response time according to the application's (expected) running state.

In addition to one or more of the features described above or below, or as an alternative, further embodiments of the invention include selecting the node based on the corresponding predicted response time being a lowest of the predicted response times.

In addition to one or more of the features described above or below, or as an alternative, further embodiments of the invention include determining that execution of the workload on the node exceeds a threshold related to the corresponding predicted response time, and deploying the workload to another node of the selected nodes, the another node having another corresponding predicted time closest to the corresponding predicted response time. Thus, advantageously providing an optimization for the deployed pod, which redeploys the pod to the next best node.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 6A and 6B together depict Table 1 illustrating training data in accordance with one or more embodiments of the present invention;

FIG. 10 depicts a block diagram of docker image layer processing resulting in Table 2 having features of a requested pod in accordance with one or more embodiments of the present invention;

DETAILED DESCRIPTION

One or more embodiments of the present invention provide computer-implemented methods, computer systems, and computer program products arranged and configured to provide a cognitive scheduler for Kubernetes. According to one or more embodiments, a cognitive method or technique is used to schedule new workloads in Kubernetes according to application programming interface (API) response time. Pods can also be referred to as workloads. As noted herein, the basic scheduling unit in Kubernetes is a pod, which is a grouping of containerized components. In other words, a pod includes one or more containers where each container includes a software application along with everything that is needed to start/run/execute the software application including, for example, libraries, configuration files, etc. Determining which node in a cluster on which to schedule and/or deploy a workload can incorporate the use of certain components. Example components used in the scheduling may include a cognitive priority component, workload performance model, features processing, independent service response time calculator, and an optimizer of scheduled pods, according to one or more embodiments.

Workload of cloud applications changes dynamically with time. In order to better balance resource usage and performance, Kubernetes as a container orchestration tool provides the ability to auto scale the worker nodes to contain pods dynamically. Cloud native applications are deployed to a pod. When the workload increases, Kuberentes will create more pods or increase the resource of a pod. When a pod is pending to deploy, the Kubernetes scheduler will try to select one suitable worker node, and currently the selection is rules based which mainly and/or only considers available resources. If there are no available resources, a cluster autoscaler will create more worker nodes so that all pods have a place to run.

The cloud application has significant performance and cost difference when running on different architecture hardware, such as different processors. Different applications have different behaviors and have better performance on certain processor architectures, and such performance is captured in one or more embodiments. One or more embodiments have provided a new way to determine which node is suitable for a new pod, by choosing high performance worker nodes for pending workloads. One or more embodiments further take into account the (existing) concurrent requests count on the worker nodes when determining which node is suitable for a new pod.

Figure 1:
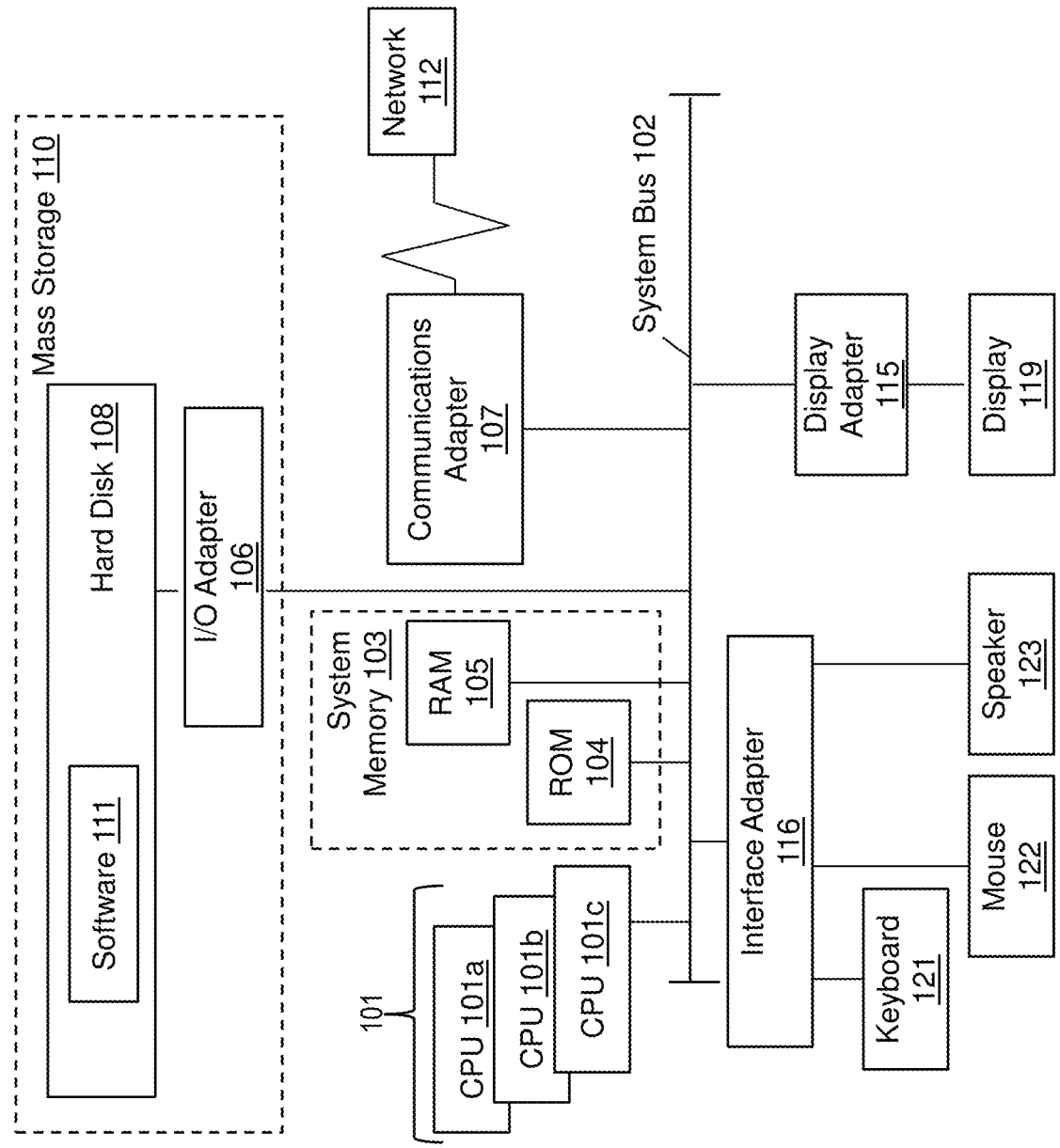
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
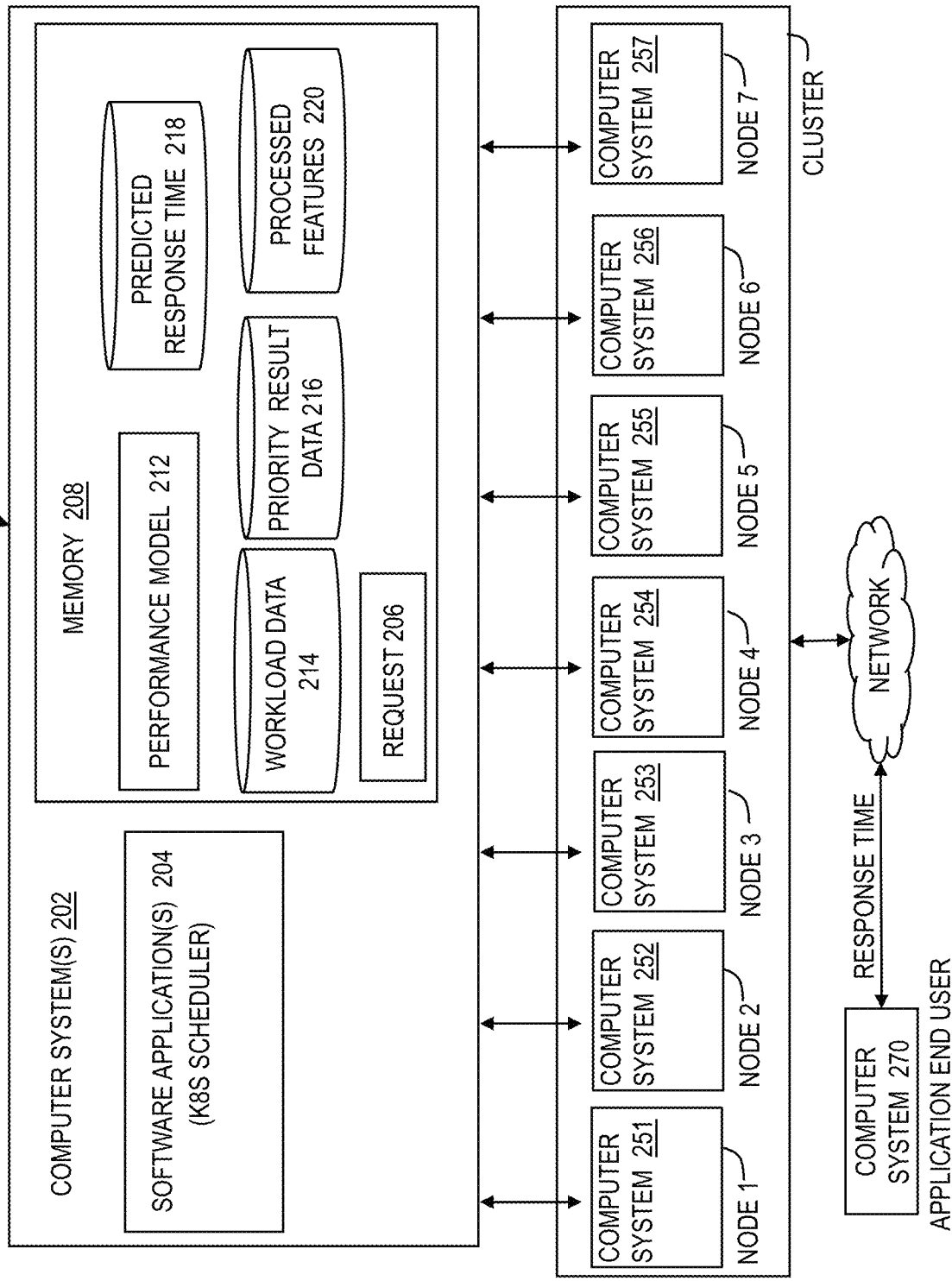
FIG. 2 depicts a block diagram of a system for scheduling and deploying a pod on the best/highest performance node in accordance with one or more embodiments of the present invention.

FIG. 2 is a block diagram of a system 200 for providing and using a cognitive scheduler for Kubernetes to schedule and deploy a pod on the best/highest performance node in accordance with one or more embodiments of the present invention. System 200 includes computer system 202 coupled computer systems 251, 252, 253, 254, 255, 256, 257. Computer system 202 may be referred to as the control node, master node, master, Kubernetes deployment controller, etc. Computer systems 251, 252, 253, 254, 255, 256, 257 may be referred to as worker nodes, workers, etc., and can each be a server. For illustration purposes, computer systems 251, 252, 253, 254, 255, 256, 257 can respectively correlate to nodes 1, 2, 3, 4, 5, 6, 7 in a cluster. Computer systems 251, 252, 253, 254, 255, 256, 257 can generally be referenced as computers systems 251-257. Any of computer systems 251, 252, 253, 254, 255, 256, 257 can provide services to one or more end users, such as an application end user utilizing computer system 270 to access a node. One or more applications can be executed on computer systems 251-257 in order to carry out desired services. Computer system 202, computer systems 251-257, and computer system 270 can include any elements and functions of computer system 100 discussed in FIG. 1. Software applications 204 may include the functionality of a Kubernetes scheduler and/or Kubernetes deployment controller for scheduling and deploying pods on nodes. Software applications 204 may be implemented as software 111 having computer-executable instructions for execution by processors 101. As understood by one of ordinary skill in the art, the Kubernetes deployment controller is a tool that manages the launch of a deployment on a Kubernetes cluster. The controller monitors the state of the cluster and can make or request changes as needed to move that cluster's workloads to the desired state. Each Kubernetes deployment uses a so called a "pod template" or simply pod. This pod template or pod provides a specification that determines what the pod should look like, what application runs inside of the pod's containers, and more, as understood by one of ordinary skill in the art.

Figure 3:
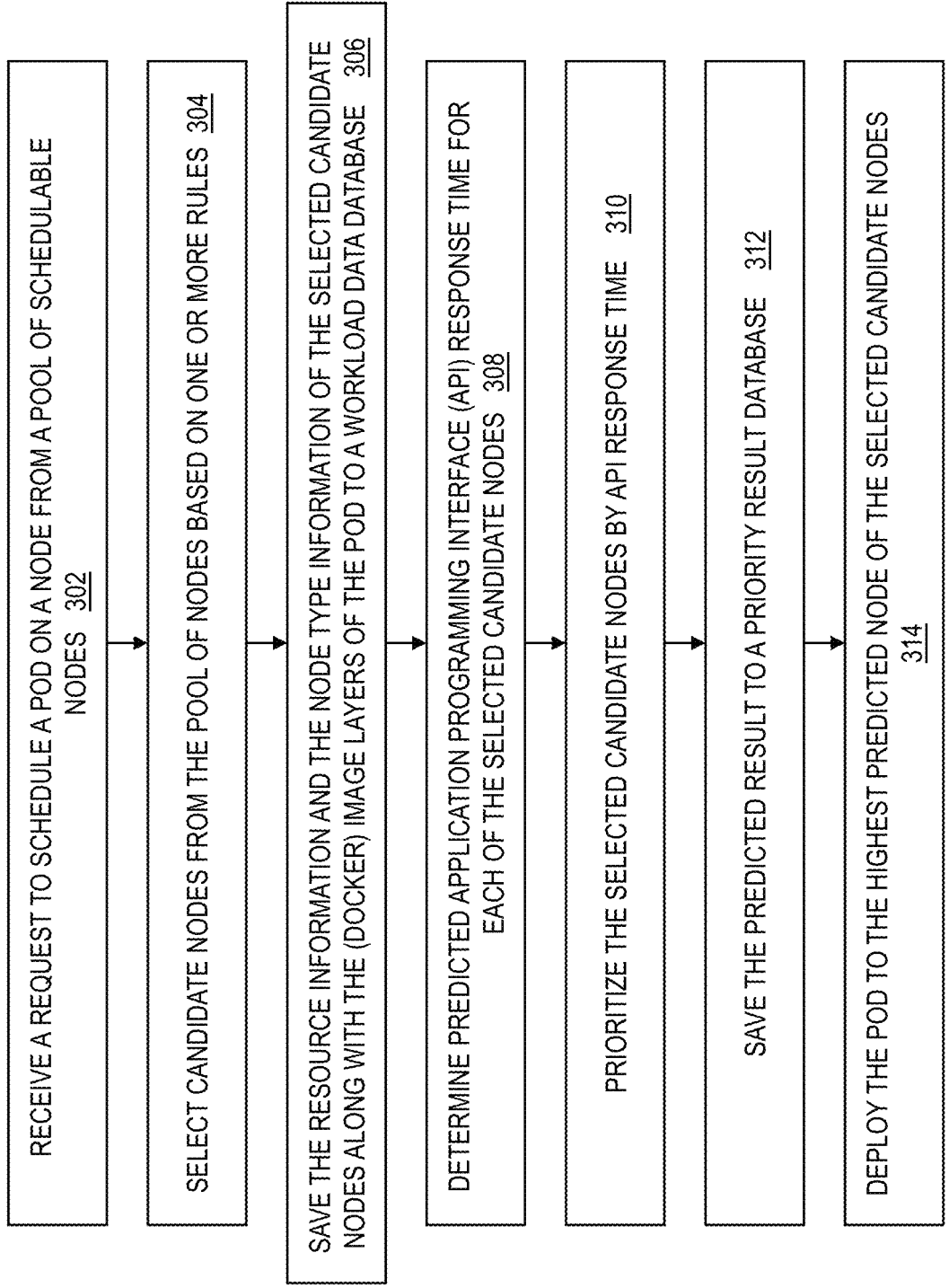
FIG. 3 depicts a flowchart of a computer-implemented process for scheduling and deploying a pod on the best/highest performance node in accordance with one or more embodiments of the present invention.

FIG. 3 is a flowchart of a computer-implemented process 300 for providing and using a cognitive scheduler for Kubernetes to schedule and deploy a pod on the best/highest performance node in accordance with one or more embodiments of the present invention. The computer-implemented process 300 in FIG. 3 can be implemented using system 200 shown in FIG. 2. Accordingly, the computer-implemented process 300 will now be described with reference to system 200.

At block 302, software application 204 of computer system 202 is configured to receive a request 206 to schedule a pod on a node from a pool of schedulable nodes. Nodes 1, 2, 3, 4, 5, 6, 7 (generally referred to as nodes 1-7) are schedulable worker nodes which could potentially contain and run the requested pod. The pod includes a software application that is configured to be run on one of the nodes. Particularly, the pod contains a container having all that is needed to execute the software application. In one or more embodiments, the pod includes a Docker image which is a file, comprised of multiple layers, that is used to execute code in a Docker container. An image is built from the instructions for a complete and executable version of an application, which relies on the host operating system (OS) kernel. When the Docker user runs an image, it can become one or multiple instances of that container. The pod is a workload and can also be referred to as a workload herein. An operator or administrator can input the request 206 to schedule and deploy the pod using computer system 202 and/or using another computer system that is coupled to computer system 202.

At block 304, software application 204 is configured to select candidate nodes from the pool of nodes based on one or more rules. For example, the selected candidate nodes can be selected based on having enough hardware and software resources to accommodate a new pod. In this example scenario, it is assumed that software application 204 has selected candidate nodes 4, 5, 6, 7 which correspond to computer systems 254, 255, 256, 257, respectively.

At block 306, software application 204 is configured to save to workload data database 214 and process the resource information and the node type information for each of the selected candidate nodes 4, 5, 6, 7, as well as the (Docker)

image layers information and the concurrency count of the requested pod. Workload data database 214 may be stored in memory 208. Examples of the resource information can include type and speed of central processing unit (CPU) (i.e., processor type and speed, processor architecture, etc.), (size and type of) input/output (I/O), memory usage of node, etc., for each of the selected candidate nodes 4, 5, 6, 7. Node type information includes information regarding any existing pods being respectively run on each of the selected candidate nodes 4, 5, 6, 7. Node type information can include the type of machine, such as the type of server. Docker image layer information of the requested pod can include the application's information, for example, what operation system, what middleware, what applications are in the image layer, and their version. The concurrency count of the requested pod refers to an expected number of users and/or expected number of requests from end users who will interact with the software application of the requested pod. When the request 206 is made, the operator or administrator may input the projected value for the concurrency count for the requested pod, and/or the concurrency count may be a predetermined value for requested pod.

Software application preprocesses the collected data for each of the selected candidate nodes 4, 5, 6, 7 to be utilized with the data for the requested pod, all of which is in preparation for determining a predicted response time for the requested pod. Preprocessing or features processing may include changing the docker images layers to an integer, changing machine types to integers, etc. The processed features of the resource information and the node type information for each of the selected candidate nodes 4, 5, 6, 7, as well as the (Docker) image layers information and the concurrency count of the requested pod, can be stored in a processed features database 220.

At block 308, software application 204 (acting as a cognitive priority component) is configured to determine the predicted application programming interface (API) response time (or simply predicted response time) for the selected candidate nodes 4, 5, 6, 7, given the data for the requested pod. API response time refers to the amount of time it takes a pod executed on a respective node to return results to an end user, after receiving a submitted end-user request from the end user utilizing, for example, computer system 270. The selected candidate nodes 4, 5, 6, and 7 each have and/or had one or more existing pods running, prior to the request 206 for the pod. The predicted API response time for each selected candidate node 4, 5, 6, and 7 is based on the response time for respective existing pods (currently) being executed on the selected candidate nodes and the data of the requested pod. Accordingly, each candidate node has a predicted API response time for the requested pod. Software application 204 is configured to save the predicted API response time of the requested pod for each selected candidate node in a predicted response time database 218.

Further, software application 204 can utilize, employ, and/or call various techniques, algorithms, and models to individually determine the predicted API response time for each candidate node based on the resource information and the node type information for each candidate node and based on the (Docker) image layer information and the concurrency count of the requested pod. In one or more embodiments, software application 204 may use machine learning techniques including linear regression, extreme gradient boosting, etc., to train a model. Also, software application 204 may use machine learning such as deep learning like a neural network. In one or more embodiments, software application 204 may include and/or employ a workload performance model 212 to determine the predicted API response time for each candidate node based on the resource information and the node type information for each candidate node and based on the (Docker) image layer information and the concurrency count of the requested pod. Workload performance model 212 can be trained using any of the machine learning techniques and algorithms discussed herein, along with any other suitable techniques.

At block 310, software application 204 is configured to prioritize selected candidate nodes 4, 5, 6, 7 based, at least in part, on the respective predicted API response times for the requested pod. For example, candidate node 7 may be the highest/best performing node because it has the lowest predicted API response time. Candidate node 6 may be the second highest performing node because it has the second lowest predicted API response time. Candidate node 5 may be the third highest performing node because it has the third lowest predicted API response time. Finally, candidate node 4 may be the fourth highest performing node because it has the fourth lowest predicted API response time. In one or more embodiments, software application 204 can determine a score for each of the selected candidate nodes. In addition to predicted API response time of the requested pod for each of the candidate nodes 4, 5, 6, 7, software application 204 can account for resources of each candidate node such as CPU, I/O, memory usage, etc., node type information for each candidate node, docket image layer information of the requested pod, and the assumed concurrency count of the API for the requested pod. As such, software application 204 can determine a score for each candidate node using the factors discussed herein. In one or more embodiments, different weights can be applied to each factor where predicted API response time is given the largest weight, therefore having the most influence is causing a node the have the highest score. The highest/best performing node to the lowest performing node can be ranked based on the highest score.

At block 312, software application 204 is configured to save the predicted priority results of the prioritized/ranked candidate nodes, along with the associated input data related to the candidate nodes and the pod, in a priority result data database 216.

At block 314, software application 204 is configured to deploy and/or cause the requested pod to be deployed on the node determined to be the highest/best performance node. In one or more embodiments, the highest/best performance node has the lowest predicted API response time for the requested pod. In this example, the highest/best performance node of the candidate nodes 4, 5, 6, 7 is node 7. Accordingly, software application of the pod is executed and run on node 7, for access by respective application end users.

Figure 4:
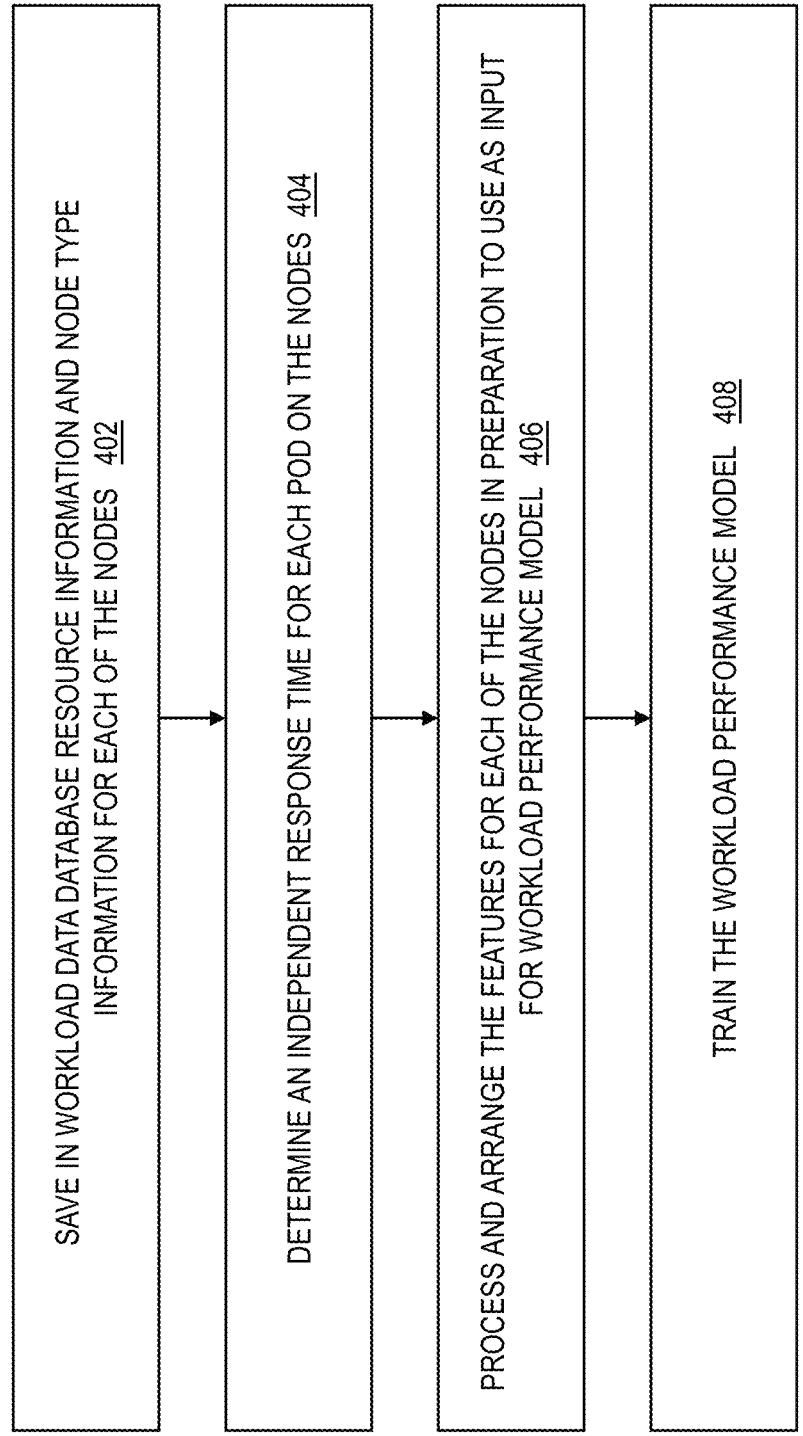
FIG. 4 depicts a flowchart of a computer-implemented process for training a workload performance model in accordance with one or more embodiments of the present invention.
Figure 5:
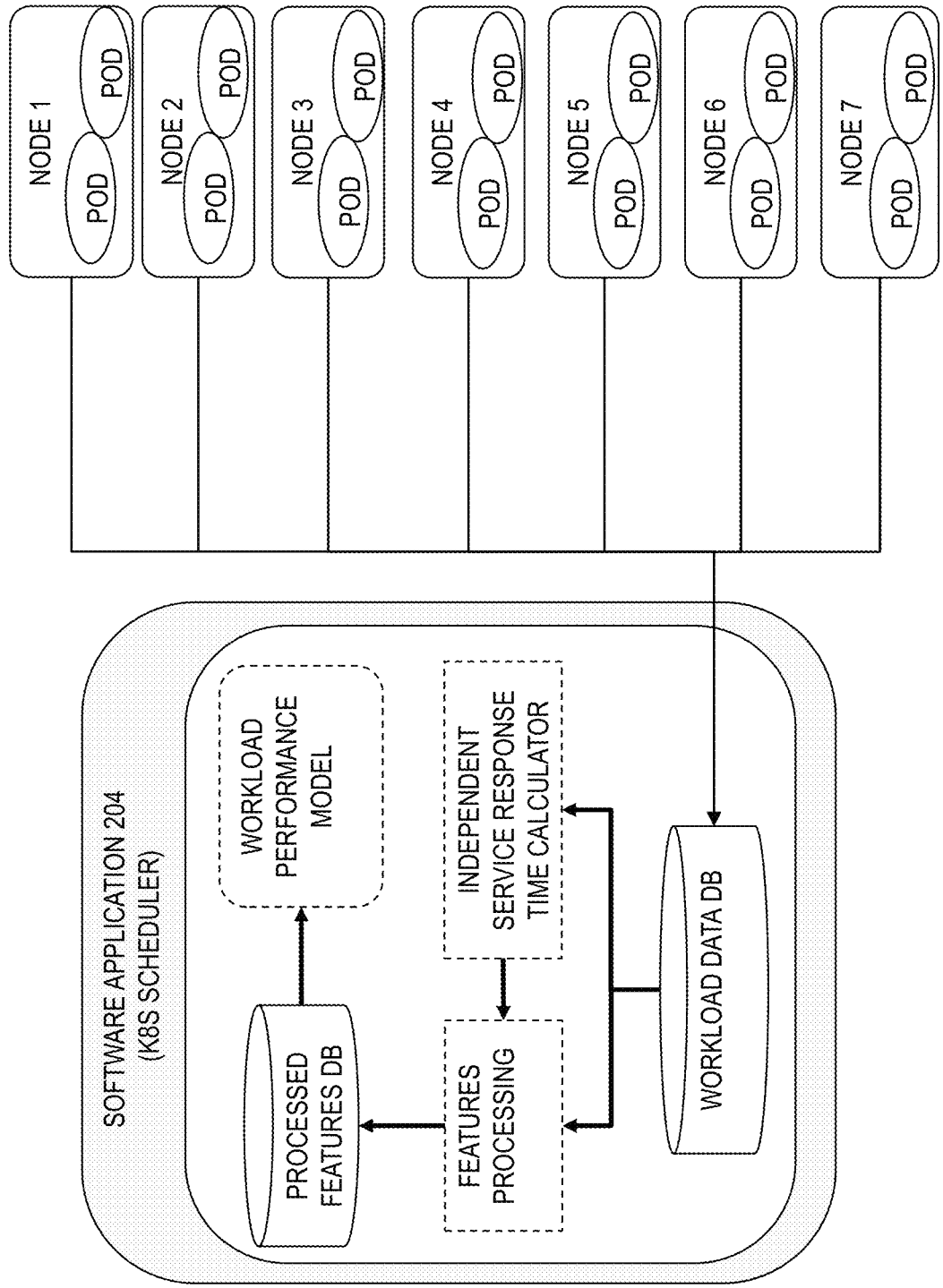
FIG. 5 depicts a block diagram of a system workflow for training the workload performance model in accordance with one or more embodiments.

FIG. 4 is a flowchart of a computer-implemented process 400 for training workload performance model 212 in accordance with one or more embodiments of the present invention. The computer-implemented process 400 in FIG. 4 can be implemented using system 200 shown in FIG. 2. FIG. 5 is a block diagram of a system workflow used to illustrating training for workload performance model 212 in accordance with one or more embodiments.

At block 402, software application 204 on computer system 202 is configured to save in workload data database 214 resource information and node type information for each of the nodes 1-7. As noted herein, resource information can include type and speed of central processing unit (CPU), (size and type of) input/output (I/O), memory usage of node, etc. Node type information includes information regarding any existing pods being respectively run on each of the nodes 1-7. A representation of pods is shown as ovals in FIG. 5. For illustration purposes, each node is shown having two pods. It should be appreciated that nodes are not limited to two pods, and fewer or more pods can be utilized. Node type information for each node can include the currency count of end users accessing respective existing pods every X time units (e.g., every 10 seconds) for each of nodes 1-7, as well as the response times of existing pods for nodes 1-7.

At block 404, software application 204 is configured to determine an independent response time for each existing pod on the nodes 1-7. The independent response time is an independent time for each pod executing on a node, even accounting for cases when the pod has to call one or more different pods. Software application 204 may include and/or call an independent service response time calculator to determine the independent response time, for each pod in nodes 1-7. Although not shown, an example scenario is given using example pods A, B, and C to further explain use of the independent service response time calculator, and example pods A, B, C could be running on the same node or on two or more different nodes. Taking pod A for an example, the software application 204 using the independent service response time (IST) calculator is configured to perform a service call hook to obtain the service provided by pod A. For example, the service hook can interpret the request and response, and mark the request timestamp and response timestamp of a call. The response timestamp minus the request the timestamp is the value. In some cases, the independent response time of a service for a pod, e.g., pod A, is based on the execution of pod A (only) which is means that the response time is independent of the response time for any other pods. In other cases, the response time of the service for pod A is based on the execution of pod A as well as the execution of one or more other pods such as pods A and/or B. Using the service call hook and/or any other suitable technique, software application 204 is configured to analyze the call path of pod A and mark the call path of pod A as a synchronous call (e.g., blocking call) or an asynchronous call (e.g., non-blocking call). For a synchronous call, software application 204 may determine that the relationship is Service A→ServiceB→Service C respectively for pod A, pod B, pod C, where pod A is dependent on pod B which is dependent on pod C. For the synchronous call, software application 204 is configured to determine the following: IST (for pod A)=TA-TB-TC, where TA is response time of pod A, TB is response time of pod B, and TC is response time of pod C. For an asynchronous call, software application 204 may determine that the relationship is Service A→Service B and Service A→Service C where pod A has a dependency on pod B and where pod A has a dependency on pod C. For the asynchronous call, software application 204 is configured to determine: IST (for pod A)=TA-MAX (TB, TC), where MAX(TB, TC) is a selection of the maximum response time between the response time of pod B and the response time of pod C.

At block 406, software application 204 is configured to process and arrange the features for each of the nodes 1-7 in preparation to use as input (i.e., training data) for workload performance model 212. The processed features can be stored in processed features database 220. An example of processed features used as source data to train workload performance model 212 is depicted as Table 1 in FIGS. 6A and 6B. Table 1 illustrates source data having three rows each representing a node and eleven columns of data. It should be appreciated that more than three nodes are used as training data, and more or fewer columns of data may be utilized. For ease of understanding, each node has a single pod represented in Table 1. For each node, column 1 is the row number, column 2 is the time stamp, column 3 is the percentage of CPU used, column 4 is the disk I/O (e.g., the buffer size of the bus), column 5 is the network I/O (e.g., the speed of the bus), column 6 is the available memory, and column 7 is the docker images for an existing pod on the respective node. Continuing Table 1 in FIG. 6B, column 8 is the concurrency count for the existing pod, column 9 is the node name, and column 11 is the independent response time for the existing pod.

At block 408, software application 204 is configured to train/execute the workload performance model 212, thereby training the workload performance model 212. Referring back to the example scenario, for each node, the trained workload performance model 212 takes the input data and generates a predicted response time for the requested pod of request 206, discussed herein. Using the previous example of candidate nodes 4, 5, 6, 7, the predicted response time of the requested pod may be 20 milliseconds (ms) on node 7, 25 ms on node 6, 100 ms on node 5, and 150 ms on node 4.

As briefly mentioned above, machine learning techniques including linear regression, extreme gradient boosting, deep learning like a neural network, etc. may be used to train workload performance model 212. In one or more embodiments of the invention, engines/classifiers (described in more detail below) may be implemented on the processing system 100 shown in FIG. 1 or can be implemented in a neural network. In embodiments of the invention, the features of the engines/classifiers can be implemented by configuring and arranging the processing system 100 to execute machine learning algorithms. In general, machine learning algorithms, in effect, extract features from received data (e.g., inputs to the engines/classifiers) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The machine learning algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In one or more embodiments of the invention where the engines/classifiers are implemented as neural networks, a resistive switching device (RSD) can be used as a connection (synapse) between a pre-neuron and a post-neuron, thus representing the connection weight in the form of device resistance, or software representing the same neural networks can be utilized. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network.

Figure 7:
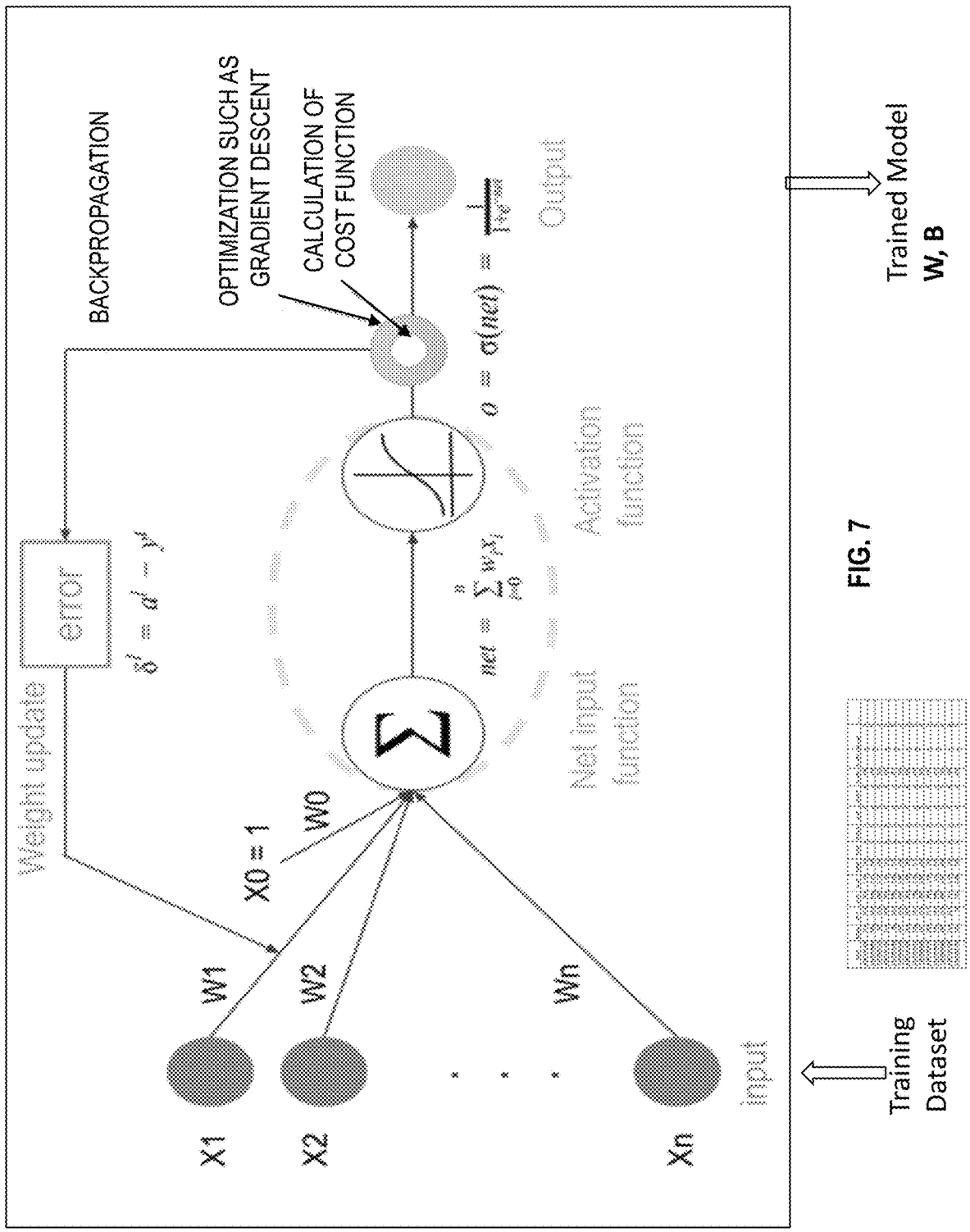
FIG. 7 depicts an example neural network in accordance with one or more embodiments of the present invention.

FIG. 7 depicts an example neural network that may be utilized in accordance with one or more embodiments. The neural network can have one or more hidden layers. Although an example neural network is illustrated in FIG. 7, workload performance model 212 is not meant to be limited to a neural network.

Figure 8:
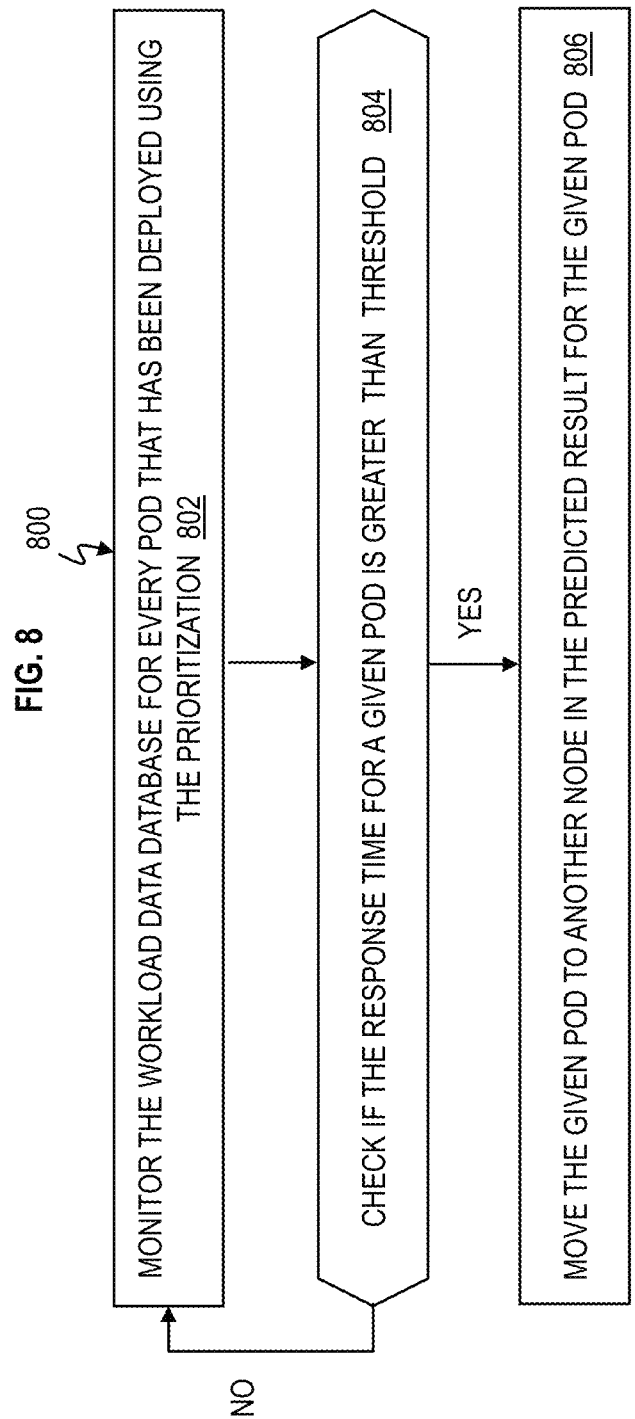
FIG. 8 depicts a flowchart of a computer-implemented process for optimizing the deployed pod in accordance with one or more embodiments of the present invention.
Figure 9:
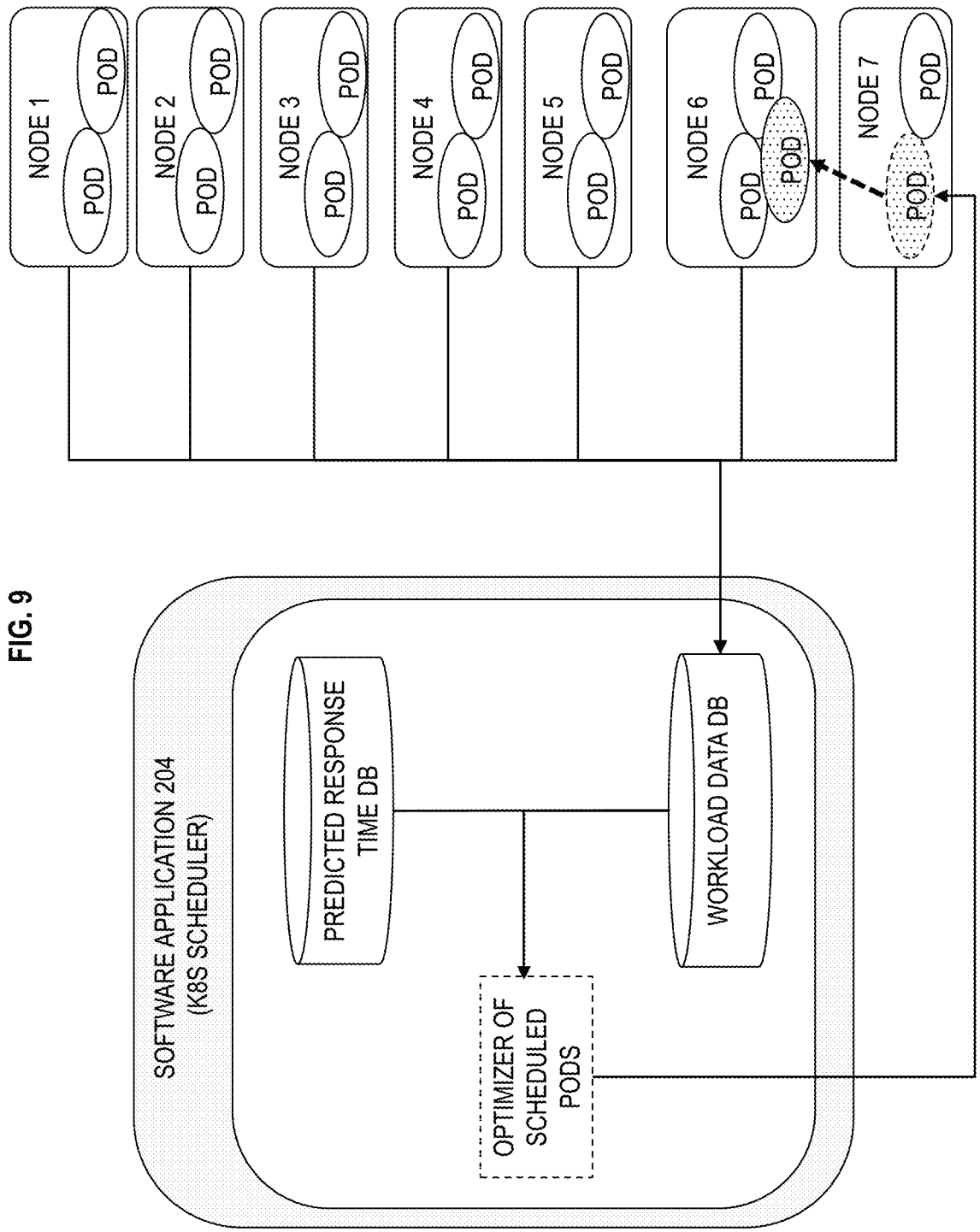
FIG. 9 depicts a system workflow for optimizing the deployed pod in accordance with one or more embodiments of the present invention

FIG. 8 is a flowchart of a computer-implemented process 800 for optimizing the deployed pod in accordance with one or more embodiments of the present invention. The computer-implemented process 800 in FIG. 8 can be implemented using system 200 shown in FIG. 2. FIG. 9 depicts a system workflow for optimizing the deployed pod in accordance with one or more embodiments. At block 802 of the computer-implemented process 800 of FIG. 8, software application 204 (e.g., K8s scheduler) is configured to monitor workload data database 214 which continuously receives information about nodes running on nodes 1-7 as seen in FIG. 9. At block 804, software application 204 is configured to check if the actual response time for a given pod is greater than a predetermined threshold. The predetermined threshold can be set in advanced. Also, the predetermined threshold can be set as a value that is a predetermined percentage (e.g., Y %) greater than the predicted response time for the given pod. As noted above, each requested pod had a predicted response time per candidate node. At block 806, software application 204 is configured to redeploy and/or move the given pod to another node, where the other node ranked in the predicted result for the given pod. As noted herein, each node has a predicted response time stored in predicted response time database 218 and has priority result data stored in priority result data database 216. Using the example scenario discussed herein, software application 204 is configured to cause the requested pod running on node 7 (i.e., where candidate node 7 was the highest/best performing node) to be moved to the second highest/best performing node which was node 6. FIG. 9 shows that the given pod with the dotted pattern has been transferred from node 7 and deployed on node 6. The pod has a dashed outline in node 7, which indicates that the given pod has been moved.

FIG. 10 is a block diagram of docker image layer processing to be used as features for a requested pod of request 206 in accordance with one or more embodiments of the invention. The Docker image layers are used to start and execute a software application on a node. The Docker image layers of the requested pod is extracted by software application 204 resulting in example information in Table 2, and the information in Table 2 is used to determine the predicted response time for the requested pod for the candidate nodes discussed herein. The information in Table 2 is built from the hash identification (hash ID) of the Docker image layers. Each Docker image layer represents information depicted in Table 2, such as operating system (OS), OS level, middleware, M-version, applications, and A-version. FIG. 10 is the flow about how to obtain the integer from the docker images layers. First, software application 204 and/or K8S scheduler is configured to match the docker image layers using a knowledge database to find the corresponding OS and OS Level, record the integer of the OS (0~65535) and OS Level (0~255), and then match the layers to find the corresponding Middleware (0~65535) and M-Version (0~255). Second, software application 204 and/or K8S scheduler is configured to change the integer value from decimal to binary and merge all bits of the binaries to generate a single binary. Additionally, software application 204 and/or K8S scheduler is configured to change the binary to hexadecimal, the hexadecimal value will be used as input feature. As seen in the flow of FIG. 10, the underlined portions correspond to each other, the bold portions correspond to each other, and the normal text portions correspond to each other. The hexadecimal value includes all portions.

There are various technical solutions and benefits disclosed herein. One or more embodiments fully considers the application's type and characteristics in order to select the most suitable node on which to deploy the application (e.g., pod or workload). One or more embodiments can dynamically select the most suitable node according to the applications' running state which may vary in different times and situations. Accordingly, improvements assist customers in selecting a high performance node. Further, cognitive method can improve the Kubernetes scheduler by proving a level of intelligence. One or more embodiments can improve the cluster scheduler of Kubernetes which is beneficial in a multiple platform cloud.

Figure 11:
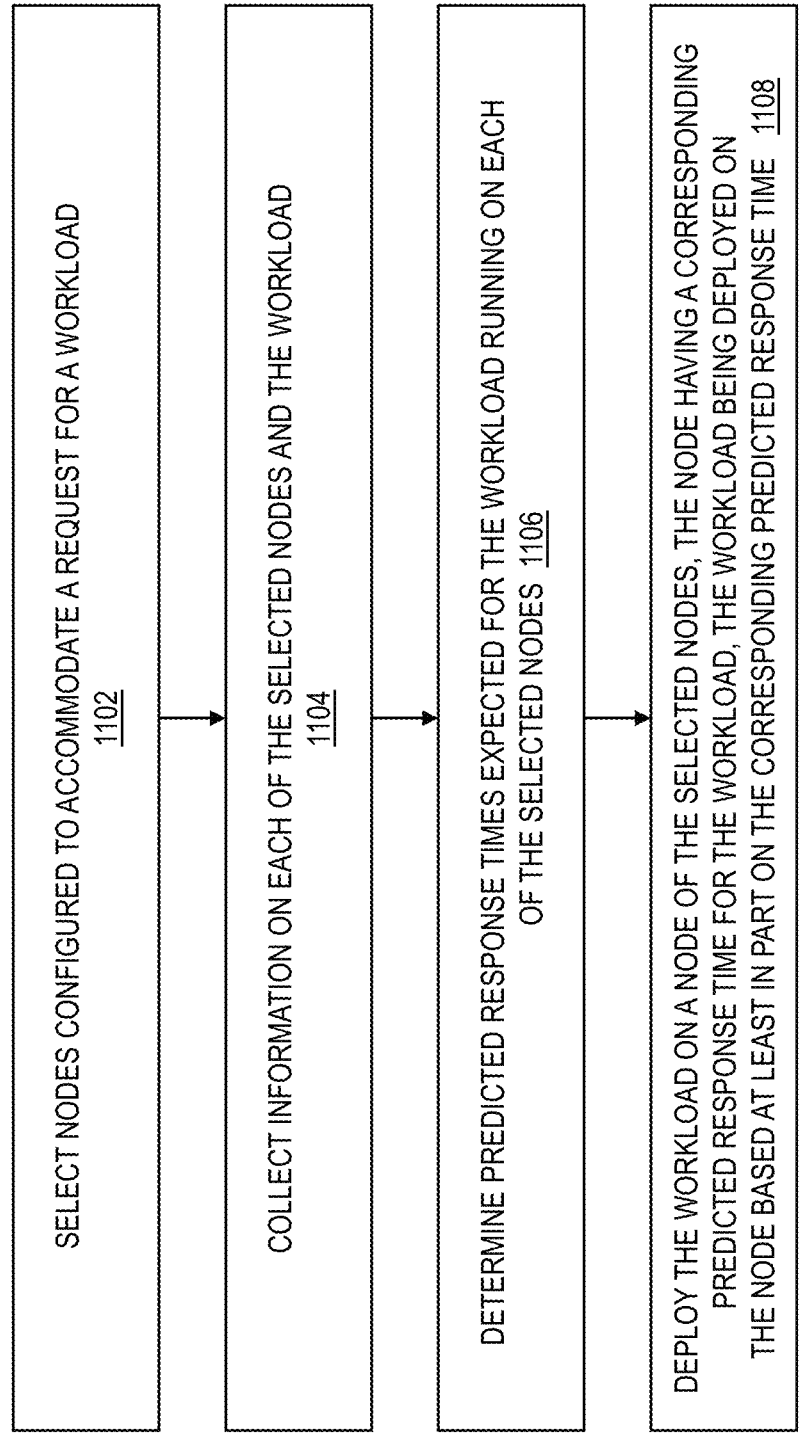
FIG. 11 depicts a flowchart of a computer-implemented method for deploying a workload (i.e., pod) on the best/highest performance node in accordance with one or more embodiments of the invention.

FIG. 11 is a flowchart of a computer-implemented method 1100 for deploying workload (i.e., a pod) on the best/highest performance node in accordance with one or more embodiments. The computer-implemented method 1100 can be performed by the system 200 in FIG. 2. At block 1102, software application 204 of computer system 202 is configured to select nodes (e.g., selected candidate nodes) configured to accommodate a request 206 for a workload (e.g., requested pod). At block 1104, software application 204 is configured to collect information on each of the selected nodes and the workload. For example, software application 204 is configured to collect information for selected candidate nodes and information of the requested pod, all of which can be stored in workload data database 214. At block 1106, software application 204 is configured to determine predicted response times expected for the workload running on each of the selected nodes (e.g., selected candidate nodes), based on the collected information for the selected nodes and the workload. At block 1108, software application 204 is configured to deploy the workload and/or cause the workload to be deployed on a node of the selected nodes (e.g., node 7 of the selected candidate nodes 4, 5, 6, 7), the node having a corresponding predicted response time for the workload, the workload being deployed on the node based at least in part on the corresponding predicted response time.

In one or more embodiments, the corresponding predicted response time is a lowest predicted response time of the predicted response times. Software application 204 is configured to rank/prioritize the selected nodes (e.g., selected candidate nodes 4, 5, 6, 7) based on the predicted response times. Software application 204 is configured to select the node based on the corresponding predicted response time being a lowest of the predicted response times. Software application 204 is configured to determine that execution of the workload (e.g., the deployed pod) on the node (e.g., node 7) exceeds a threshold related to the corresponding predicted response time and deploy the workload to another node (e.g., node 6) of the selected nodes, the another node having another corresponding predicted time closest to the corresponding predicted response time. An example of the optimization is depicted in FIGS. 8 and 9. Selecting nodes configured to accommodate the request for the workload includes determining that the selected nodes (e.g., selected candidates nodes 4, 5, 6, 7) have available resources to run the workload. The workload is a pod, the pod includes a container.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
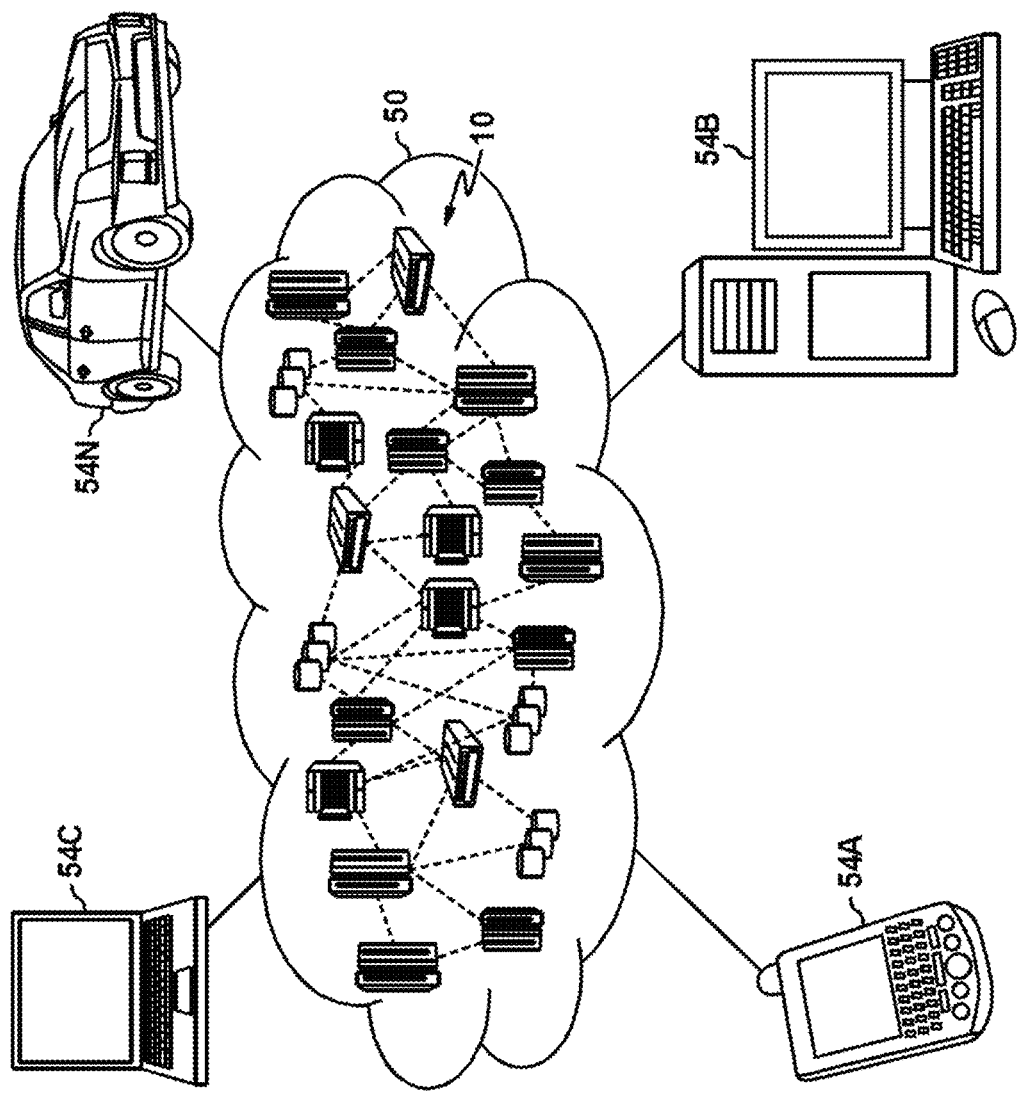
FIG. 12 depicts a cloud computing environment according to one or more embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
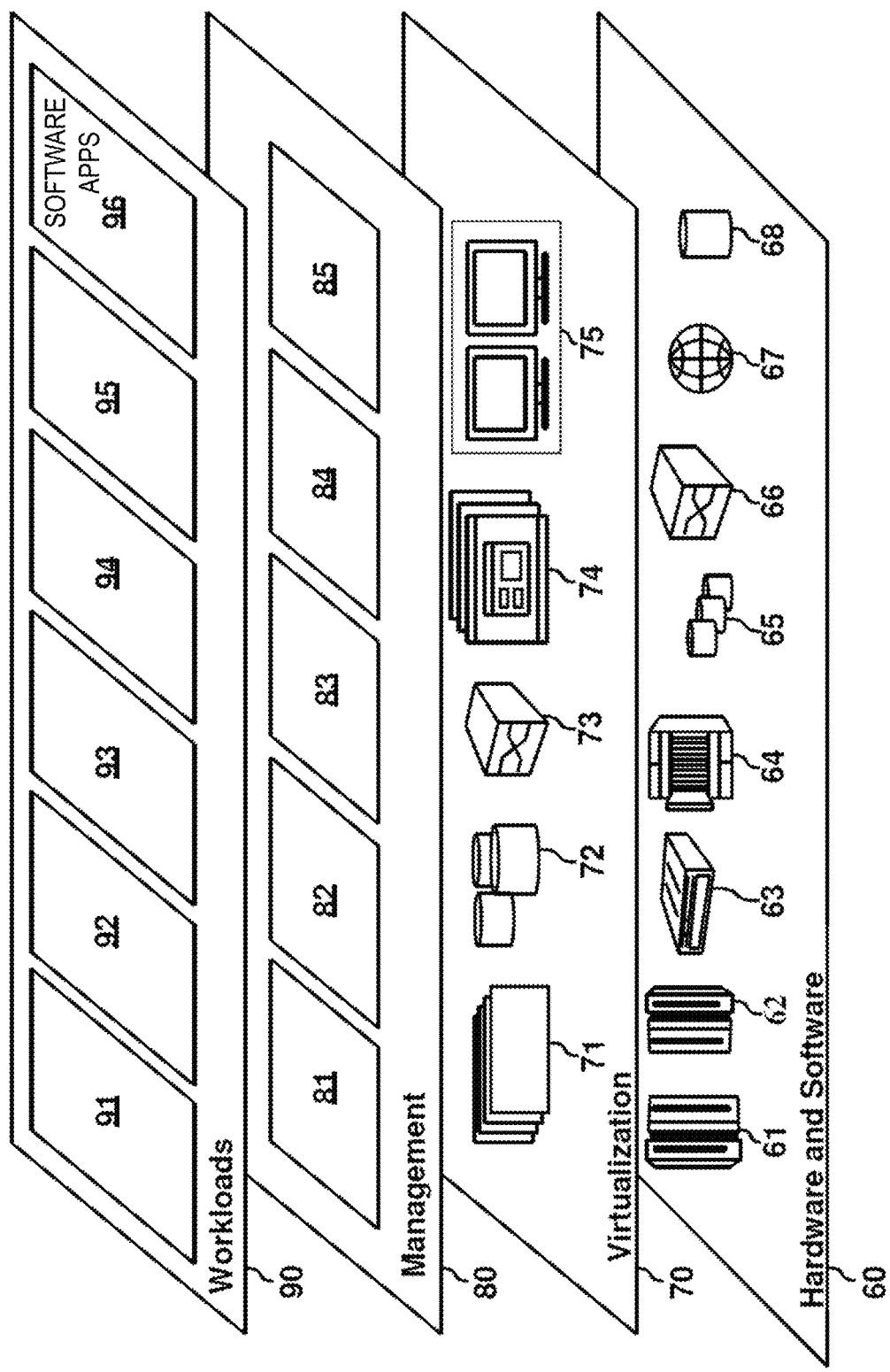
FIG. 13 depicts abstraction model layers according to one or more embodiments of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 204, workload performance model 212, etc.) implemented in workloads and functions 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   selecting nodes configured to accommodate a request for a workload;
   collecting information on each of the selected nodes and the workload;
   determining predicted response times expected for the workload running on each of the selected nodes;
   deploying the workload on a node of the selected nodes, the node having a corresponding predicted response time for the workload;
   determining that execution of the workload on the node exceeds a threshold related to the corresponding predicted response time; and
   deploying the workload to another node of the selected nodes, the another node having another corresponding predicted time closest to the corresponding predicted response time.

2. The computer-implemented method of claim 1, wherein the corresponding predicted response time comprises a lowest predicted response time of the predicted response times.

3. The computer-implemented method of claim 1 further comprising ranking the selected nodes based on the predicted response times.

4. The computer-implemented method of claim 1 further comprising selecting the node based on the corresponding predicted response time being a lowest of.

5. The computer-implemented method of claim 1, wherein selecting the selected nodes configured to accommodate the request for the workload comprises determining that the selected nodes have available resources to run the workload.

6. The computer-implemented method of claim 1, wherein the workload comprises a pod, the pod comprising a container.

7. A system comprising:
   a memory having computer readable instructions; and
   one or more processors for executing the computer readable instructions, the computer readable instructions controlling the one or more processors to perform operations comprising:
   selecting nodes configured to accommodate a request for a workload;
   collecting information on each of the selected nodes and the workload;
   determining predicted response times expected for the workload running on each of the selected nodes; and
   deploying the workload on a node of the selected nodes, the node having a corresponding predicted response time for the workload;
   determining that execution of the workload on the node exceeds a threshold related to the corresponding predicted response time; and
   deploying the workload to another node of the selected nodes, the another node having another corresponding predicted time closest to the corresponding predicted response time.

8. The system of claim 7, wherein the corresponding predicted response time comprises a lowest predicted response time of the predicted response times.

9. The system of claim 7, wherein the one or more processors perform operations further comprising ranking the selected nodes based on the predicted response times.

10. The system of claim 7, wherein the one or more processors perform operations further comprising selecting the node based on the corresponding predicted response time being a lowest of the predicted response times.

11. The system of claim 7, wherein selecting the selected nodes configured to accommodate the request for the workload comprises determining that the selected nodes have available resources to run the workload.

12. The system of claim 7, wherein the workload comprises a pod, the pod comprising a container.

13. A computer program product comprising a computer readable storage medium having program instructions embodied therewith, the program instructions executable by one or more processors to cause the one or more processors to perform operations comprising:
   selecting nodes configured to accommodate a request for a workload;
   collecting information on each of the selected nodes and the workload;
   determining predicted response times expected for the workload running on each of the selected nodes; and
   deploying the workload on a node of the selected nodes, the node having a corresponding predicted response time for the workload;
   determining that execution of the workload on the node exceeds a threshold related to the corresponding predicted response time; and
   deploying the workload to another node of the selected nodes, the another node having another corresponding predicted time closest to the corresponding predicted response time.

14. The computer program product of claim 13, wherein the corresponding predicted response time comprises a lowest predicted response time of the predicted response times.

15. The computer program product of claim 13, wherein the one or more processors perform operations further comprising ranking the selected nodes based on the predicted response times.

16. The computer program product of claim 13, wherein the one or more processors perform operations further comprising selecting the node based on the corresponding predicted response time being a lowest of the predicted response times.

17. The computer program product of claim 13, wherein selecting the selected nodes configured to accommodate the request for the workload comprises determining that the selected nodes have available resources to run the workload.

\* \* \* \* \*